United States Patent
Kakehi et al.

(10) Patent No.: US 6,703,129 B1
(45) Date of Patent: Mar. 9, 2004

(54) PLASTIC CLIP BONDING METHOD AND PLASTIC CLIP

(75) Inventors: T. Kakehi, Toyohashi (JP); T. Inoue, Kitaougi Izumichou (JP)

(73) Assignee: Newfrey LLC, Newark, DE (US)

( * ) Notice: Subject to any disclaimer, the term of this patent is extended or adjusted under 35 U.S.C. 154(b) by 532 days.

(21) Appl. No.: 09/625,828

(22) Filed: Jul. 26, 2000

(30) Foreign Application Priority Data

Jul. 27, 1999 (JP) .......................................... 11-212310

(51) Int. Cl.$^7$ ................................................. B32B 33/00
(52) U.S. Cl. ........................................ 428/409; 24/455
(58) Field of Search ............................... 156/73.1, 73.2, 156/73.3, 81, 155, 308.2, 308.4; 245/3; 428/542.8, 543, 409; 24/455, 457, 570

(56) References Cited

U.S. PATENT DOCUMENTS

| 4,644,520 A | 2/1987 | Lange ........................ 369/284 |
| 4,987,018 A | * 1/1991 | Dickinson et al. ......... 428/36.9 |
| 6,066,216 A | * 5/2000 | Ruppel, Jr. ................. 156/73.1 |

FOREIGN PATENT DOCUMENTS

| EP | 0 174 283 | 3/1986 |
| EP | 0 233 644 | 8/1987 |
| JP | 58-74315 | 5/1983 |
| JP | 63-176134 | 7/1988 |
| JP | 63-212532 | 9/1988 |
| JP | 63-278821 | 11/1988 |
| JP | 03-67722 | 8/1989 |
| JP | 02-124131 | 10/1990 |
| JP | 04-208656 | 7/1992 |
| JP | 5-147109 | 6/1993 |
| JP | 9-133112 | 5/1997 |

OTHER PUBLICATIONS

English translation of JP 63–278821.*

* cited by examiner

*Primary Examiner*—Richard Crispino
*Assistant Examiner*—Sing P Chan
(74) *Attorney, Agent, or Firm*—Edward D. Murphy

(57) ABSTRACT

To provide a method for bonding a plastic clip onto a natural fiber based porous member and a plastic clip for use in the bonding method that the clip can be bonded with a low energy without any of heat affection and any dent on a rear side of the clip, and the excessive molten portions will be handled well.

A plastic clip 1 comprises a base 5 having a bonding side including a welding region 6 and a non-welding region 7. The welding region 6 includes a plurality of fusible projections 9 extending to the natural fiber based porous member and a plurality of recesses 10 adjacent the projections for receiving the excessive molten portions of the projections. The non-welding region 7 is formed with a reference level portion 11 to set the welding height of the plastic clip.

6 Claims, 4 Drawing Sheets

PLASTIC CLIP BONDING METHOD AND PLASTIC CLIP

BACKGROUND OF THE INVENTION

The present invention relates to a method of bonding a plastic clip such as a retainer onto a natural fiber based porous member such as an automobile door trim by welding, and a plastic clip for use in the bonding method.

As a door trim or the like of an automobile, for weight reduction and cost saving, natural fiber based porous members including epoxy plastic as a binder are often utilized. Since the door trim or the like contains as much as 70% in weight of natural fiber, stamping is used for its forming. Therefore, the plastic clip such as the retainer for attaching the door trim to the automobile body is formed separately from the door trim which is made of the natural fiber based porous member. Therefore, the plastic clip such as the retainer is required to be integrally connected with the natural fiber based porous member of the door trim. To this end, ultrasonic welding or the like has been used. For example, Japanese Patent Laid-open No. 04-208656 discloses a method of attaching a fastener of a plastic clip to a roof lining having a glass fiber substrate by ultrasonic welding. In accordance with that attaching method, a portion of the attaching side of the plastic clip is melted into the glass fiber portions and voids thereof, so that a tangled bond of plastic and the glass fibers can be obtained. To apply it to a case where the plastic clip is bonded onto the natural fiber based porous member by welding, this attaching method must be somewhat improved.

As described above, in the automobile door trim, the natural fiber based porous member including epoxy plastic as a binder is often used. When the epoxy plastic clip is ultrasonic-welded onto the natural fiber based porous member, including epoxy plastic as a binder, its bond strength often is not stabilized. Therefore, in order to obtain higher bond strength than a certain level, very high ultrasonic energy and very large pressure force are required for welding. As a result, the deformations due to heat affections and the pressed dents of the ultrasonic welding tip may appear on the bonding side and the rear side of the clip. Thus, it is desired to provide a method that can bond the clip with low energy, without any heat affections and any dents to the rear side of the clip when the plastic clip is bonded onto the natural fiber based porous member.

Japanese Patent Laid-Open No. 03-67722 discloses a method of ultrasonic-welding a plastic retainer clip onto a door trim. In this patent, the problems of the heat affection and dent are pointed out, and a proposal is made to eliminate the boundary gap between the door trim and the retainer bracket. In particular, a projected ridge is formed on the attaching side of the retainer bracket, the projected ridge is positioned in a recess of the attaching side of the door trim and then melted for bonding by ultrasonic-welding to fill the gap between the recess on the attaching side of the door trim and the outer side of the retainer bracket. In this method, there is a restriction in molding of the door trim because a recess for receiving the retainer bracket is necessary on the attaching side of the door trim. Therefore, it is desired to bond the plastic clip onto the natural fiber based member, without such restriction, any heat affections and any dents to the rear side, and also with lower energy.

Other technologies for welding another plastic part onto a plastic member are described in Japanese Patent Laid-Open No. 63-212532, Japanese Patent Laid-Open No. 63-278821, and Japanese U. M. Laid-Open No. 02-124131. In Japanese Patent Laid-Open No. 63-212532, the projected leg is formed on the attaching side of the plastic bracket and is ultrasonic-welded so that the plastic brackets are bonded onto the plastic roof lining of the automobile. However, this welding has excessive molten portions of the legs. Also, in Japanese Patent Laid-Open No. 63-278821, a plastic retainer for holding a small accessory is welded onto a plastic product so as to attach the small accessory on the plastic product. For the purpose of welding the retainer, a projection is provided having sharp tip end on the bonding side of the retainer. This projection is then melted to bond the retainer onto the plastic product. Again, there is excessive molten portions of the projections. In Japanese U. M. Laid-Open No. 02-124131, a projected portion is formed as a welding site in a core material portion of the wooden fiber based mat so as to ultrasonic-weld the plastic part onto the wooden fiber based mat. A welding portion of the plastic part is positioned on the projected portion for ultrasonic-welding. The melted welding portion of the plastic part preferably tends to be penetrated into the core material of the wooden fiber based mat, however, it is difficult to form the projected portion as the site for welding in the core portion of the wooden fiber based mat.

SUMMARY OF THE INVENTION

Therefore, an object of the present invention is to provide a method of bonding a plastic clip and a plastic clip for use in the bonding method, wherein when the plastic clip is bonded onto the porous member, there is no restriction on the shape of the natural fiber based porous member, wherein the clip can be bonded with low energy, without any heat affections and any dents on rear side of the clip, and wherein the excessive molten portions will be easy to handle.

To accomplish such object, according to the present invention, there is provided a method of bonding a plastic clip onto a natural fiber based porous member by welding. The method comprises steps of; forming a plurality of projections in a welding region of the bonding side of the plastic clip to extend to the natural fiber based porous member and a plurality of recesses adjacent the projection in the welding region for receiving the excessive molten portions of the melted projections, and further a reference level portion in a region other than the welding region at the bonding side of the plastic clip to define the welding height of the plastic clip; positioning the bonding side of the plastic clip at a predetermined position of the natural fiber based porous member; and fusing the bonding side to weld and bond the plastic clip onto the porous member.

According to the present invention, there is also provided a plastic clip for use in the above plastic clip bonding method. The plastic clip comprises a welding region and a non-welding region, the welding region is formed with a plurality of fusible projections extending to the natural fiber based porous member and a plurality of recesses adjacent the projections for receiving the excessive molten portions of the projections, and the non-welding portion is formed with a reference level portion to define the welding height of the plastic clip.

In the plastic clip, the projections and recesses may be alternately formed with each of the projections and recesses being aligned in a line. The clip may also be made of material having a high grade of melt flow index (M.F.I.). This insures that the molten plastic material can easily impregnate into voids of the natural fibers, thus high energy is unnecessary, and both the bonding strength and the peeling resistance are increased.

Further areas of applicability of the present invention will become apparent from the detailed description provided hereinafter. It should be understood, however, that the detailed description and specific examples—while indicating preferred embodiments of the invention—are intended for purposes of illustration only, since various changes and modifications within the spirit and scope of the invention will become apparent to those skilled in the art from this detailed description.

BRIEF DESCRIPTION OF THE ACCOMPANYING DRAWINGS

DETAILED DESCRIPTION OF THE INVENTION

Figure 1A:
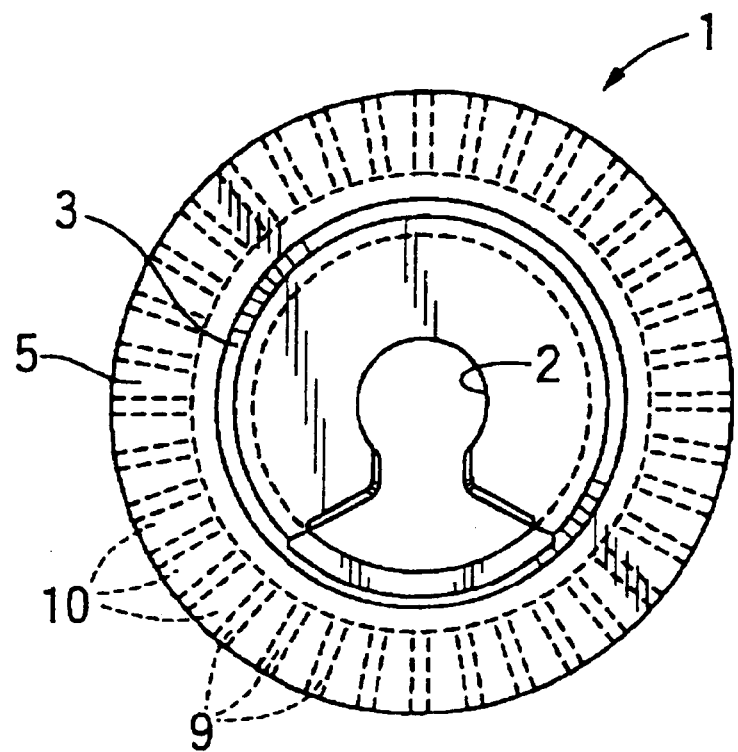
FIG. 1(A) shows a plan view of a plastic clip according to the present invention.
Figure 1B:
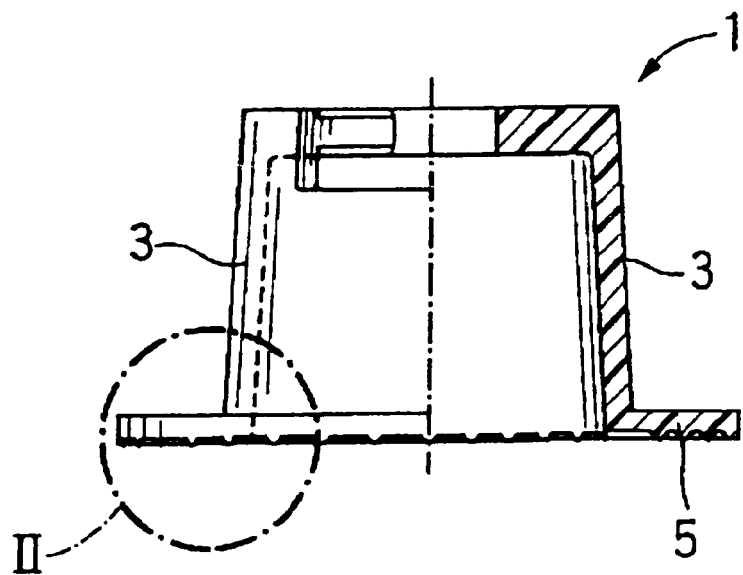
FIG. 1(B) shows a half sectional view of the plastic clip of the present invention.

A plastic clip bonding according to the present invention will now be described with reference to the drawings. FIGS. 1(A) and (B) show a plastic clip 1 according to one embodiment of the present invention. The plastic clip 1 is bonded onto a natural fiber based porous member of the door trim or the like of an automobile, and is used as a retainer for attaching it to a panel of the mobile body. Examples of the natural fibers suited for use include kenaf, hemp, sisal, flax, bagasse (sugarcane), palm, and the like. FIG. 1(A) is a top view of the clip 1, and FIG. 1(B) is a partial cross sectional view showing a right half cross sectioned portion of the clip 1. On the upper side of the clip 1, a hook 2 is formed for attaching the porous member of door trim to the panel, and the lower portion thereof is formed as a conical trapezoid-like support portion 3. A bottom portion of the clip 1 is a base 5 to be bonded onto the natural fiber based porous member, and in that embodiment of the clip 1, as shown in FIG. 1(A), is formed in a ring shape. The clip 1 shown is only an example. The plastic clip according to the present invention may be of any other shape, and it may be any clip that provides connection with other members, not being limited to the retainer.

The plastic clip 1 is molded with any plastic material having a property that is flowable when melted. The desirable material has a high grade of melt flow index (M.F.I.). This insures that the molten plastic material can easily be impregnated into voids of the natural fibers so that without need of high energy, the bonding strength and the peeling resistance are increased. For example, in the door trim or the like, polypropylene (PP) is used as a binder for the natural fibers, therefore, the same polypropylene (PP) is preferable when it is used as a retainer for the door trim of the automobile. This enables an increase in the welding strength after the plastic material is melted. In this case, other plastic materials may be used, for example, materials having high melt flow index and high viscosity after melted, such as ABS (acrylonitrile-butadiene-styrene) resin or AAS (acrylonitrile-rubber-styrene) resin may be used. In any case, plastic materials which have the property of both high melt flow index and high viscosity when melted, which tend to impregnate easily into the voids of the natural fibers when melted, and which are stiff to provide high bonding strength, are preferable.

Figure 2:
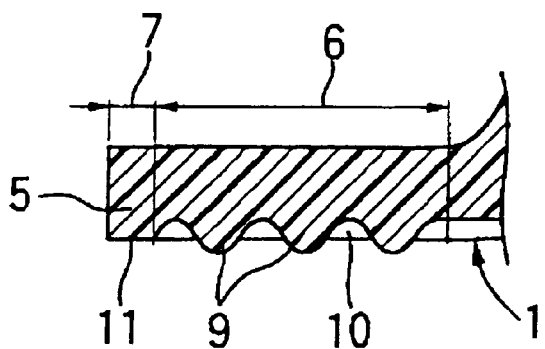
FIG. 2 is a sectional view of a clip portion of the circle II of FIG. 1(B)

The features of the plastic clip 1 according to the present invention resides in a bottom side of the base 5, that is, a bonding side to be bonded to the natural fiber based porous member. This bonding side will now be described with reference to FIG. 2. FIG. 2 is a sectional view of a portion surrounded by a circle II of FIG. 1(B). The bonding side of the base 5 of the plastic clip 1 includes a welding region 6 at the center of the ring-like base and a non-welding region 7. Furthermore, the non-welding region 7 is a portion not to be welded and is typically positioned outside of the welding region 6. The non-welding region 7 may also be inside of the welding region 6 or other places. For purpose of description, the non-welding region 7 is assumed to be outside of the welding region 6. The welding region is formed with a plurality of fusible (or melt-able) projections 9 extending to the natural fiber based porous member which is the member to be bonded. In addition, a plurality of recesses 10 for receiving the excessive molten portions of the projections 9 are formed adjacent the projections 9. As shown in FIG. 2, the projections 9 and the recesses 10 are alternately formed and each of them is aligned in a line. In this embodiment, as shown by broken lines of FIG. 1(A), a plurality of the projections 9 and a plurality of the recesses 10 are alternately formed with each of them being in a line extending radially. Such lines are formed at equal distances circumferentially. Furthermore, it is preferable that the projections 9 and the recesses 10 are alternately positioned with the line shape, however, they may not necessarily be alternately positioned in a line. The recesses 10 may arbitrarily be positioned adjacent the projection 9 so that they can receive the excessive molten portion of the projection 9.

In the present invention, the non-welding portion 7 is also formed with a reference level portion 11 for defining or setting the welding height of the plastic clip 1. Since the reference height portion 11 is formed in the non-welding portion 7, it is not melted during the welding operation, resulting in maintaining the welding height of the clip 1 constant. If there is no reference level portion 11, then the height of the base 5 might be changed in accordance with the degree of melting of the projection 7. As a result, the depth of the adjacent recess 10 might be changed. If the base 5 is forced against the bonding side of the member or workpiece under the condition that the projections 9 is in the molten state, the depth of the recesses 10 might become shallow and, thus, the excessive molten portion of the projection 9 might occur. Accordingly, the recesses 10 could not adequately receive the excessive molten portion of the projection 9, thus the excessive molten portion might be pushed out of the bonding side. However, in the present invention, with the provision of the reference level portion 11, the depth of the recesses 10 is maintained constant and the excessive molten portions of the projections 9 are adequately received without being pushed out of the bonding side.

Figure 3A:
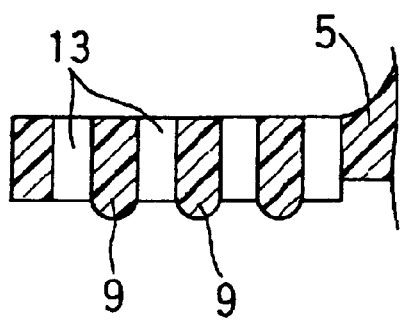
FIG. 3(A) shows a partial side elevational view showing a shape of the through holes.
Figure 3B:
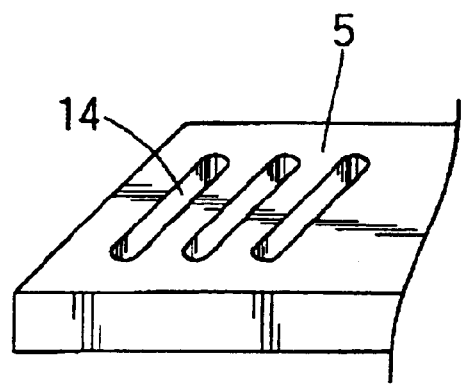
FIG. 3(B) is a partial perspective view showing the recesses having elongated through holes.
Figure 4A:
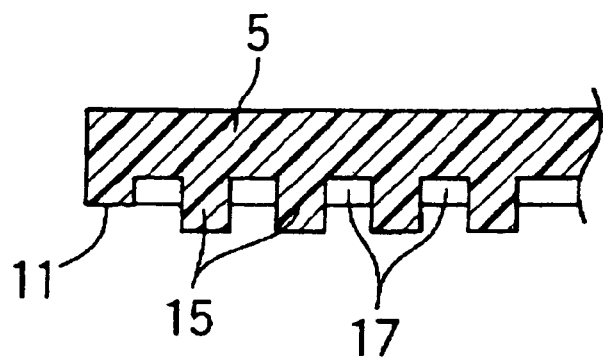
FIG. 4(A) shows a partial side elevational view of the projections having quadrangular shape.
Figure 4B:
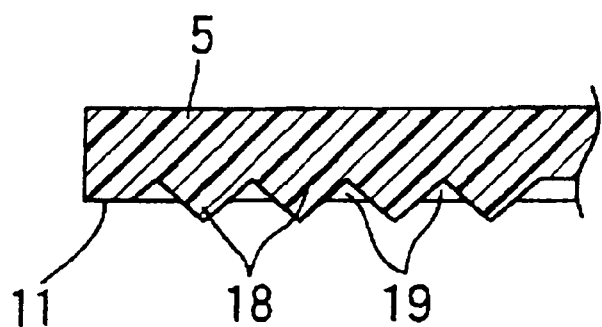
FIG. 4(B) shows a partial side elevational view showing the projections having a triangular shape.
Figure 4C:
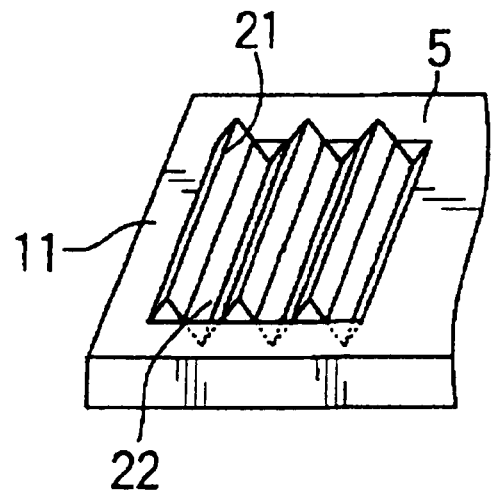
FIG. 4(C) shows a partial perspective view of the projections having a triangle rib shape.

The shape of the recesses 10 may be formed in a half sphere (as shown in FIG. 2), but they may have other any shapes. FIGS. 3(A), and 3(B) show other various recess shapes. In FIG. 3(A), the recesses 13 are formed as round holes extending through the base 5. In FIG. 3(B), the recesses 14 are formed as elongated holes extending through the base 5. Similarly, the shape of the projections 9 may be also formed in a half sphere (FIG. 2), but they may have other any shapes. FIGS. 4(A)–(C) show other various projection shapes. In FIG. 4(A), the projections 15 are formed in a quadrangular shape, and the recesses 17 can be also formed in a quadrangular shape. In FIG. 4(B), the projections 18 are also formed in a triangular shape, and the recesses 19 are formed as a triangular shape. In FIG. 4(C), the projections 21 are as a triangle rib shape, and the recesses 22 are formed in a triangular valley. Accordingly, the projections and the recesses may be formed in any shape.

Figure 5:
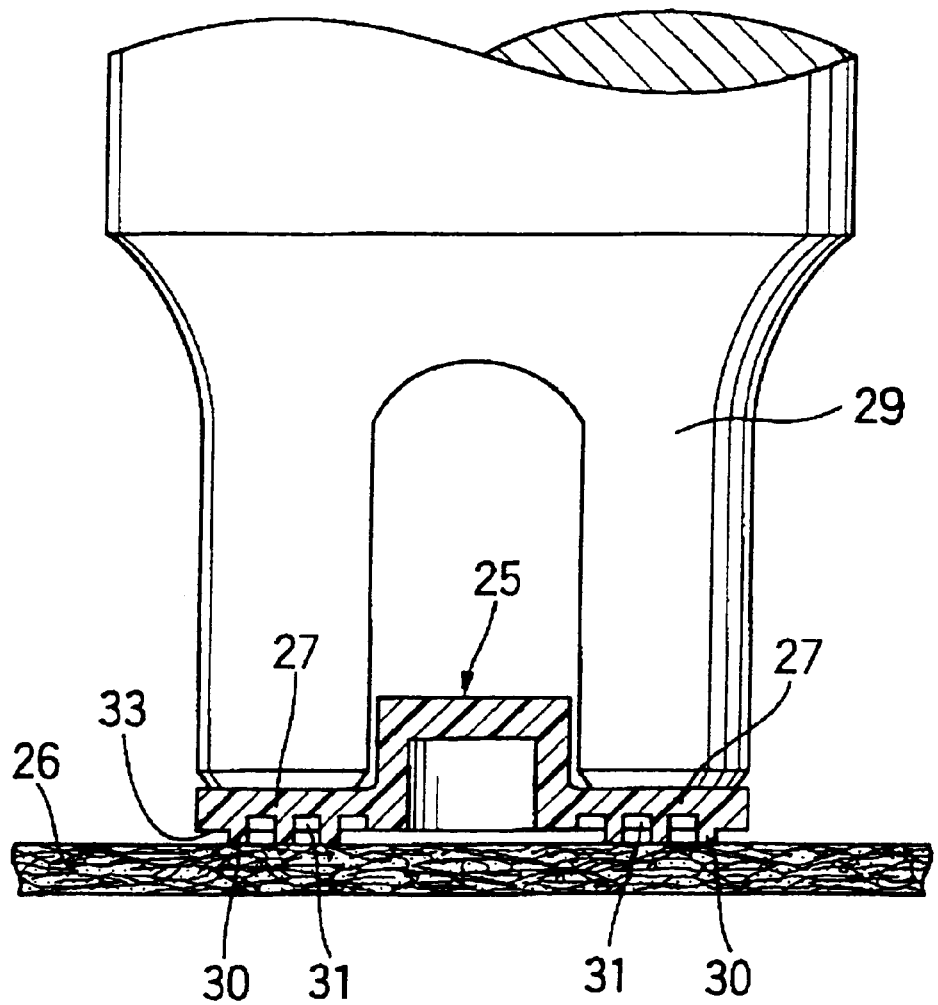
FIG. 5 is a side elevational view showing a condition wherein the ultrasonic horn of an ultrasonic welding apparatus is positioned on the clip as located at the predetermined position of the porous member in order to weld the plastic clip onto the natural fiber based porous member.
Figure 6:
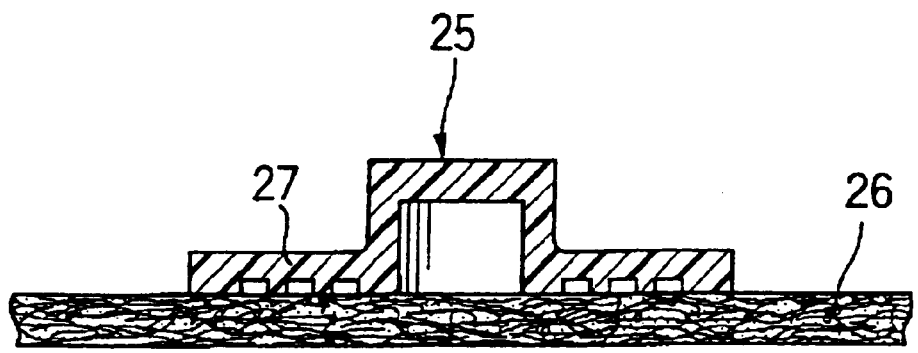
FIG. 6 is a side elevational view showing a condition after the plastic clip has been welded onto the natural fiber based porous member.

FIG. 5 shows a welding condition of a plastic clip 25 to a natural fiber based porous member 26 by ultrasonic-welding wherein the clip 25 is slightly modified in shape from the plastic clip 1 for the purpose of the illustration, and the clip 25 is bonded onto the member 26 by the ultrasonic welding. For example, the natural fiber based porous member 26 is an automobile door trim made of material comprising natural fibers connected to each other by using PP (polypropylene) as a binder. The ultrasonic horn 29 of the ultrasonic welding apparatus is positioned on a base 27 of the clip 25 which is located at the predetermined position on the porous member 27, so that a tip of the ultrasonic horn 29 is in contact with the base 27. Under this condition, ultrasonic energy is radiated from the horn 29, and then, the projections 30 on the bonding side of the base 27 of the clip 25 begin to melt them from the portions which are in contact with the porous member 26. Before its melting begins, the clip 25 vibrates by vibration due to radiation of ultrasonic energy from the horn 29, but the clip 25 is prevented from shifting from the predetermined position because the projections 30 are engaged with the porous member 26. Furthermore, since the projections 30 and the recesses 31 are alternately positioned with each being in a line, the melted region of the projections 30 tend to be impregnated into the voids between the fibers of the porous member 26, thus a high anchor effect is obtained after welding. Also, since the excessive molten portions of the projections 30 are received in the recesses 31, they will never be pushed out. This welding process continues until the reference level portion 27 firmly comes into contact with the porous member 26. After such contact, the welding process is terminated. FIG. 6 shows a condition after the clip 25 has been welded onto the porous member 26.

In FIG. 5, the tip of the ultrasonic horn 29 is shaped flat so that the ultrasonic energy is efficiently transferred to the clip 25. This is because both the projections 30 and the recesses 31 do not exist on a side of the base 27 to which the ultrasonic horn 29 contacts. Thus, the side of base 27 can be flat. This improves the efficiency of ultrasonic energy transferred from the ultrasonic horn 29 to the clip 25. Accordingly, the welding process can be accomplished with low energy, so as to reduce any heat affections and the force required to press the clip 25, resulting in eliminating any dent. In addition, by providing the reference level portion 33, the depth of the recesses 31 are held constant, thus the excessive molten portions of the projections 30 are adequately received, and will never be pushed out from the bonding surface of the clip 25.

While the above description utilizes the ultrasonic welding for bonding, it is understood that any other welding process may be used. For example, vibration welding may be used.

As is apparent in the embodiments shown in the drawings, the base 5 is a plate having one side to be juxtaposed with the natural fiber based porous member and having an opposite side from which an attachment structure extends away from the base for attaching the natural fiber based porous member to a body (e.g., a panel) via the clip 1. In the form shown in FIGS. 1(A) and 1(B), for example, the plate constituting the base 5 is an annulus that surrounds the attachment structure 3 and that defines a flange extending outwardly from the attachment structure 3, which is frustoconical in cross-section.

The base has a welding region 6 and a non-welding region 7. The non-welding region has a reference level portion 11 that defines a welding height at the one side of the base to be juxtaposed with the natural fiber based porous member. The welding region has a series of fusible projections (e.g., 9, 15, 18, or 21) that extend from the one side of the base beyond the reference level portion 11, and a series of recesses (e.g., 10, 13, 14, 17, 19, or 22) that extend inwardly of the base relative to the reference level portion. Each projection has at least one adjacent recess. Preferably, there are a multiplicity of projections and a multiplicity of recesses that alternate with the projections, as shown in FIG. 1(A), for example.

According to the present invention, the projections on the bonding side of the plastic clip prevent the clip from shifting relative to the natural fiber based porous member during ultrasonic welding. A portion of the projections is melted (or fused) and impregnated into the natural fiber based porous member to attribute its bonding. This melting of the projections can be accomplished with low energy, therefore any heat affections and any dents on the rear side can be prevented. The recesses formed adjacent the projections facilitate impregnation of molten portion into the voids between fibers of the porous member, resulting in a high bonding effect. Also, since the excessive molten portions of the projections are received in the adjacent recesses, it will never be pushed out. Furthermore, since the reference level portion is provided in the region except the welding region, not only the welding height is stably defined (or set) at constant level, but also the depth of the recesses is held constant for receiving the excessive molten portions of the projections. Accordingly, the resulted bonding has high bonding strength at the bonding site without any pushing-out of the excessive molten portion.

In general, the above-identified embodiments are not to be construed as limiting the breadth of the present invention. As stated earlier, modifications or other alternative constructions will be apparent which are within the scope of the invention as defined in the appended claims.

What is claimed is:

1. A plastic clip for bonding onto a natural fiber based porous member by welding, comprising:
   a base that is a plate having one side to be juxtaposed with the natural fiber based porous member and having an opposite side from which an attachment structure extends away from the base for attachment of the natural fiber based porous member to a body via the clip, wherein the base defines a flange extending outwardly from the attachment structure and has a welding region and a non-welding region, the non-welding region has a reference level portion at said one side of the base defining a welding height of the plastic clip, the welding region has a series of fusible projections extending from said one side of the base beyond the reference level portion and a series of recesses extending inwardly of the base relative to the reference level portion, and each of the projections has at least one of the recesses adjacent thereto, wherein the base is an annulus surrounding the attachment structure and a multiplicity of the projections and the recesses are disposed radially and alternately on the base.

2. A plastic clip according to claim 1, wherein the attachment structure is frusto-conical in cross-section.

3. A plastic clip according to claim 1, wherein the recesses extend from said one side of the base to the opposite side of the base.

4. A plastic clip according to claim 1, wherein the projections and the recesses are rectangular in cross-section.

5. A plastic clip according to claim 1, wherein the projections and the recesses are triangular in cross-section.

6. A plastic clip according to claim 1, wherein the projections and the recesses are hemispherical in cross-section.

* * * * *